(12) United States Patent
Chandler

(10) Patent No.: US 11,941,304 B2
(45) Date of Patent: Mar. 26, 2024

(54) SYSTEM AND METHOD FOR PRINTER LANGUAGE EMULATION

(71) Applicant: Toshiba TEC Kabushiki Kaisha, Shinagawa-ku (JP)

(72) Inventor: Steve Chandler, Dawsonville, GA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/946,584

(22) Filed: Sep. 16, 2022

(65) Prior Publication Data
US 2023/0078136 A1      Mar. 16, 2023

Related U.S. Application Data

(60) Provisional application No. 63/244,940, filed on Sep. 16, 2021.

(51) Int. Cl.
*G06F 3/12*          (2006.01)
*B41J 29/38*       (2006.01)

(52) U.S. Cl.
CPC ............ *G06F 3/1206* (2013.01); *B41J 29/38* (2013.01)

(58) Field of Classification Search
CPC .... G06F 3/1206; G06F 3/1247; G06F 3/1288; B41J 29/38
See application file for complete search history.

(56) References Cited

U.S. PATENT DOCUMENTS

| 2004/0019580 | A1* | 1/2004 | Bergstrand | G06F 3/1287 |
| 2005/0068564 | A1* | 3/2005 | Ferlitsch | G06F 3/1204 709/212 |
| 2008/0079986 | A1* | 4/2008 | Ferlitsch | G03G 21/02 358/1.15 |
| 2011/0166019 | A1* | 7/2011 | Hohberger | G09F 3/0291 503/201 |
| 2019/0164025 | A1* | 5/2019 | Yajima | G06K 15/1859 |

FOREIGN PATENT DOCUMENTS

EP          3355286 A1 *  8/2018  ......... G01G 19/4144

* cited by examiner

*Primary Examiner* — Huo Long Chen
(74) *Attorney, Agent, or Firm* — UB Greensfelder LLP; John X. Garred

(57) ABSTRACT

A system and method for printer language emulation includes a microcomputer as an intermediary between devices using incompatible printer languages. The microcomputer intercepts an incoming job in a first printer language. The first printer language leads to a library call, and the returned library is used to emulate the first printer language to a printer language compatible with a target device. If source device and target device use compatible printer languages, the print job may bypass the microcomputer or pass through the microcomputer to the target device.

17 Claims, 6 Drawing Sheets

SYSTEM AND METHOD FOR PRINTER LANGUAGE EMULATION

This application claims priority to U.S. provisional application Ser. No. 63/244,940, filed Sep. 16, 2021.

TECHNICAL FIELD OF THE INVENTION

This application relates generally to printing. The application relates more particularly to a system and method implementing a microcomputer to receive electronic documents in a source printer language for emulation and communication to a printer.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Printing systems may use a print server which receives electronic documents from networked devices and releases them to MFPs or other printing devices. Print servers may be supplied by the same manufacturer as its associated MFPs. A printer language may be implemented by use of a driver on the source devices, with the printer language being compatible with the MFPs. In certain situations, a device may be of a different type or from a different manufacturer and incompatible with the source printer language.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As noted above, a document processing job relayed through a print server may be incompatible with a document rendering device. For example, in a print system with compatible, networked MFPs, an administrator may wish to install and use an incompatible device. A device may be incompatible insofar as it uses a different printer language associated with a different manufacturer. A device may also be incompatible if it has different capabilities, such as with a device such as a dedicated label printer. It can be difficult and time consuming to provide different drivers for incompatible devices in a network sever printing system. It is also desirable that users interact with rendering devices with a consistent interface. Example embodiments herein provide an inexpensive emulation system comprised of a microcomputer, such as a RASPBERRY PI, as an intermediary between the print server and networked rendering devices. The microcomputer has one or more libraries which allow it to automatically translate an incoming document rendering instruction received in a first printer language to a printer language compatible with a target rendering device. By way of particular example, a document processing job may be received in a printer language from a driver on a user device provided by the MFP manufacturer and output the job to a target device in a compatible printer language such as Information Processing Language ("IPL").

Figure 1:
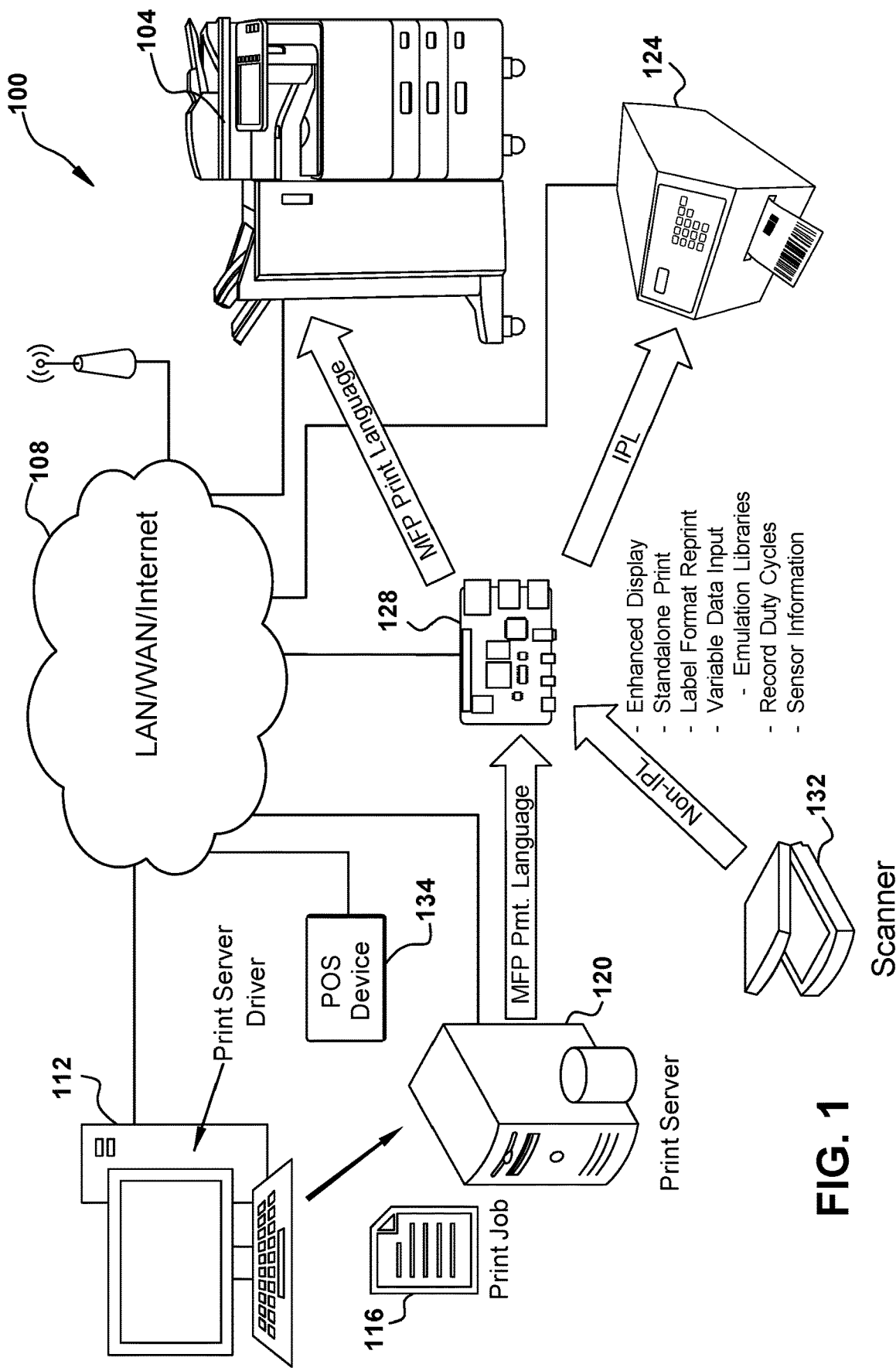
FIG. 1 an example embodiment of a system for printer language emulation.

FIG. 1 illustrates an example embodiment of a system 100 for printer language emulation. In the example, one or more MFPs, such as MFP 104, are in data communication with network cloud 108, suitably comprised of a local area network (LAN), a wide area network (WAN), which may comprise the Internet, or any suitable combination thereof. Network cloud 108 is comprised of any suitable wireless or wired data connection or combination thereof.

Also in data communication with network cloud 108 are one or more user devices, such computer 112, from which a document processing job can originate. A user may use any suitable digital device, such as a smartphone, tablet, notebook computer, or the like. In the illustrated example, computer 112 includes a print server driver that generates a document processing job in a print language compatible with MFP 104. The document processing job, such as print job 116, is relayed to print server 120 for release to MFP 104.

The system of FIG. 1 includes one or more devices, such as label printer 124, which is not compatible with the MFP print language. A print job from computer 112 is intercepted by networked microcomputer 128 from print server 120. Microcomputer 128 includes one or more libraries that facilitate translation to a print language, such as IPL, that is compatible with a target device, such as label printer 124. Microcomputer 128 may include a list of target devices associatively with a library entry for emulation. Document processing jobs may also be received in other print languages, such as may be received from scanner 132 or point-of-sale device 134 which may suitably provide additional information, such as product information from an integrated scale. Suitable libraries may be called by microcomputer 128 for print language emulation between various devices. In another example embodiment, print server 120 may itself determine whether emulation is required, and send a job directly to a device such as MFP 104, or to microcomputer 128 for emulation.

Microcomputer 128 can also facilitate an enhanced display, a standalone print, a label format reprint or record duty cycles. Sensor information, such as a print speed indicator, may also be monitored and used as detailed further below.

Figure 2:
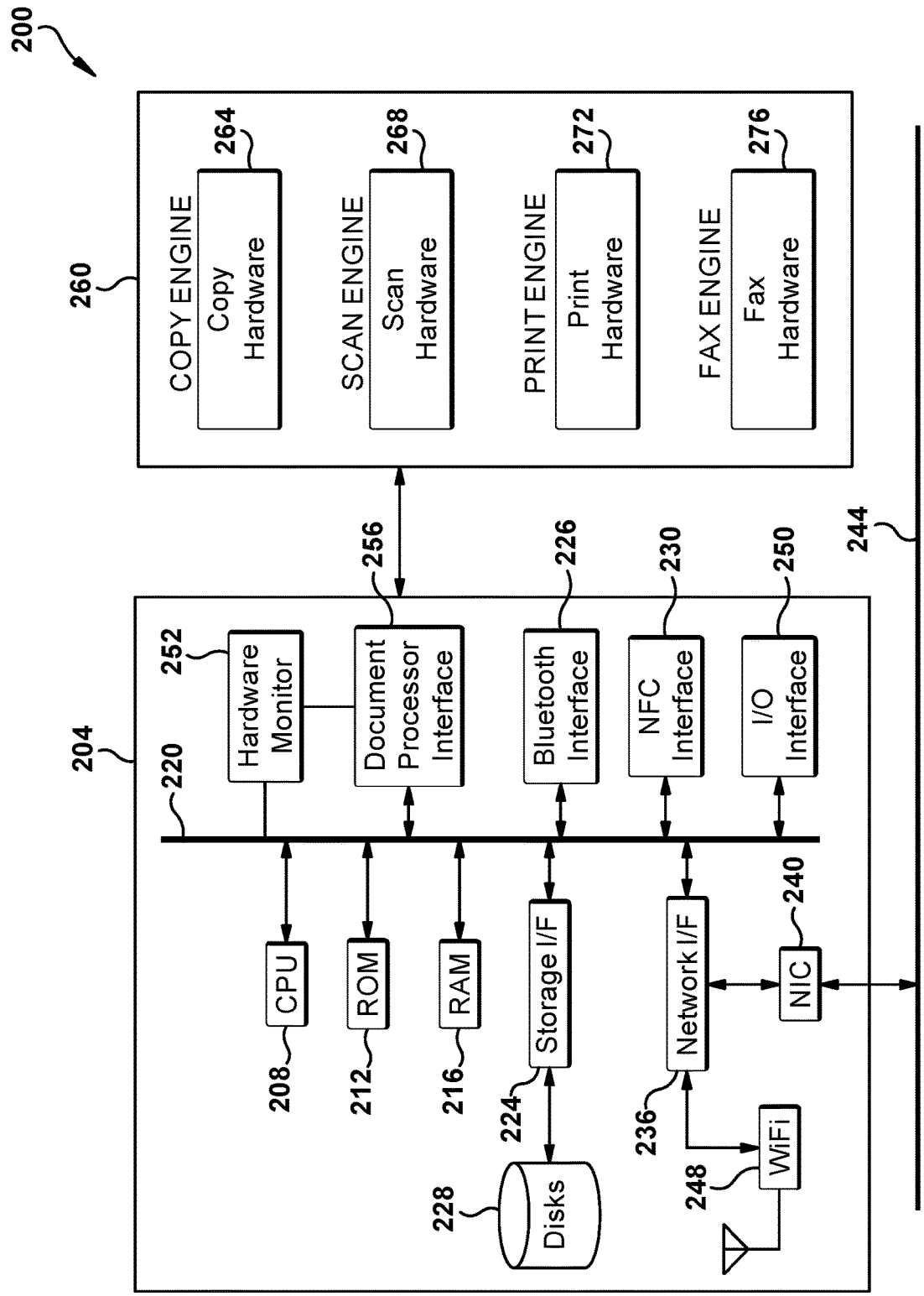
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226 and NFC interface 228.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) interface 250 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise document rendering system 260. It will be understood that functional units are suitably comprised of intelligent units, including any suitable hardware or software platform.

Figure 3:
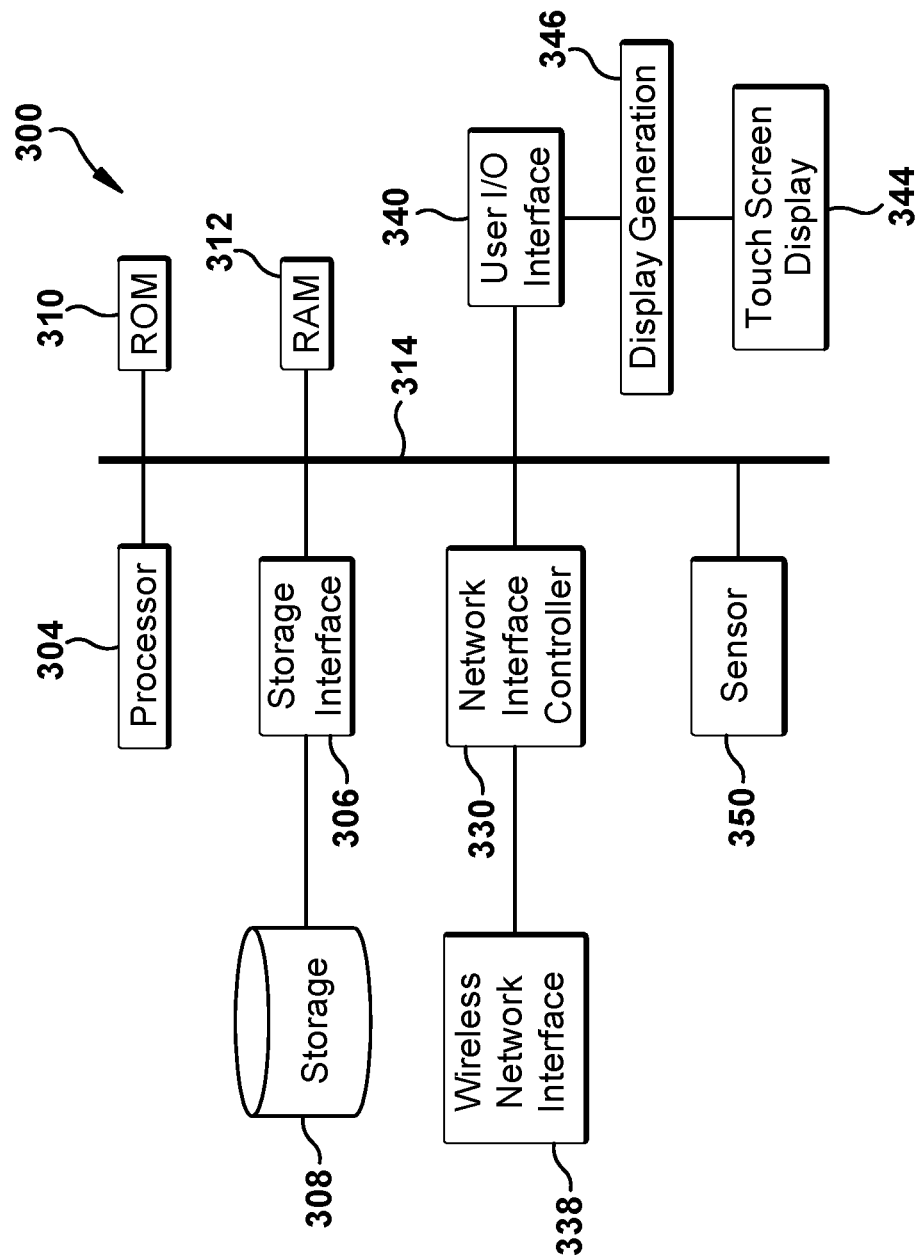
FIG. 3 is an example embodiment of a digital device system.

Turning now to FIG. 3, illustrated is an example of a digital device system 300 suitably comprising computer 112, print server 12 or microcomputer 128 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to a print server is via a data network, such as a local area network (LAN), a wide area network (WAN), which may comprise the Internet, or any suitable combination thereof. A digital data connection is also suitably directly with a print server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, control buttons, mice, track balls, touch screens such as touchscreen 344, or the like. Processor 304 is also in data communication with sensor 350, suitably comprised of non-contact reflective object sensor for sensing slack in a continuous ribbon of unprinted labels. It will be understood that functional units are suitably comprised of intelligent units, including any suitable hardware or software platform.

Figure 4:
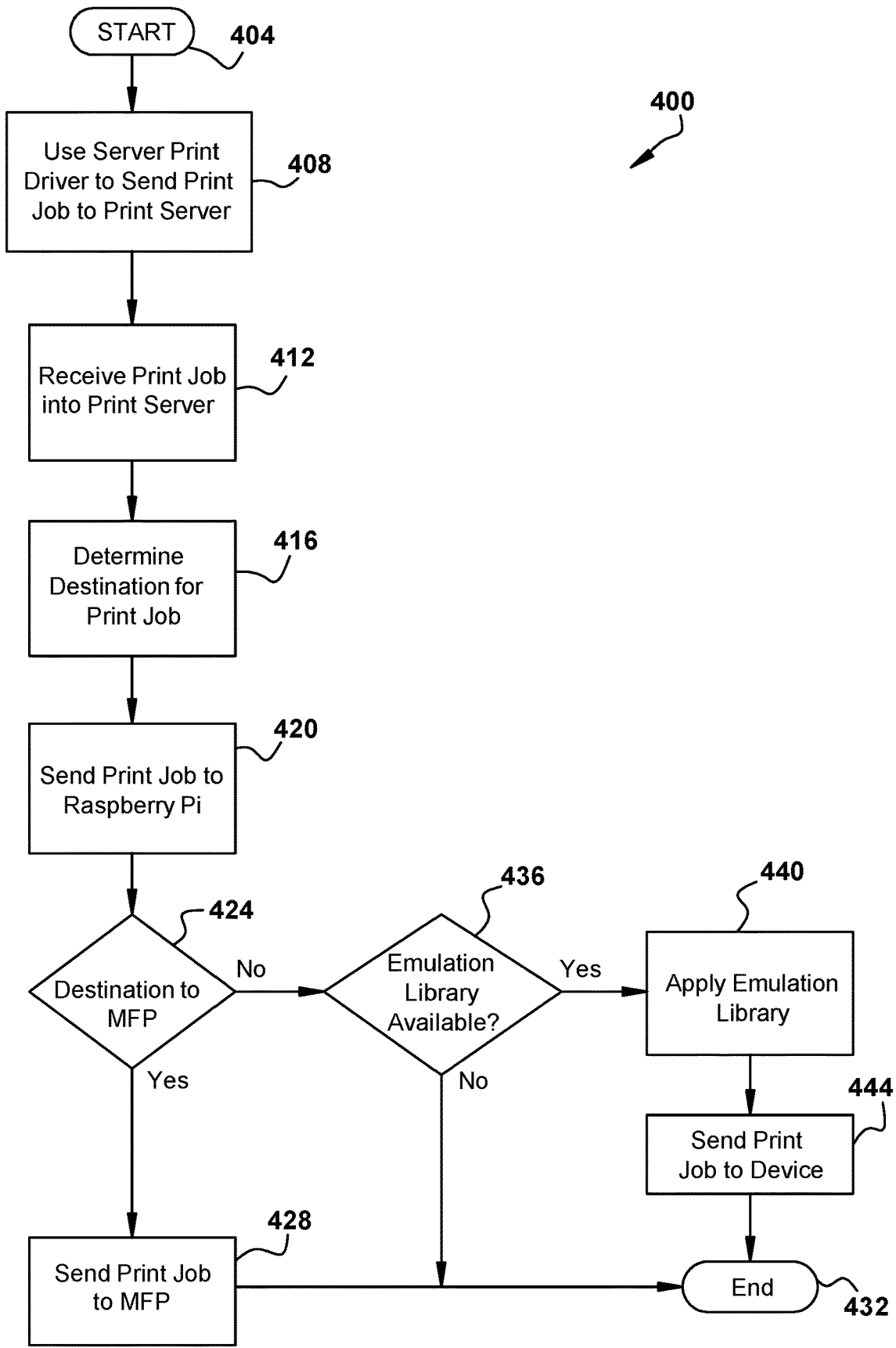
FIG. 4 is flowchart of an example embodiment of a system for print language emulation.

FIG. 4 illustrates flowchart 400 of an example embodiment of a system for print language emulation. The system commences at block 404 and proceeds to block 408 where a driver on a user device is used to send a print job which is received by a print server at block 412. In this example, the print server determines a print job destination at block 416 and sends corresponding information, along with the print job, to a microcomputer such as a RASPBERRY PI at block 420. The microcomputer determines at block 424 whether the job is for a compatible MFP. If so, the job is sent to the MFP at block 428 before the process ends at block 432. If the job is directed to a device other than a compatible MFP, a test is made at block 436 as to whether a required emulation library is present. If not, the process ends at block 432. If so, the corresponding emulation library is applied at block 440. The print job, with the emulated print language, is sent to the target device at block 444 before the process ends at block 432.

Figure 5:
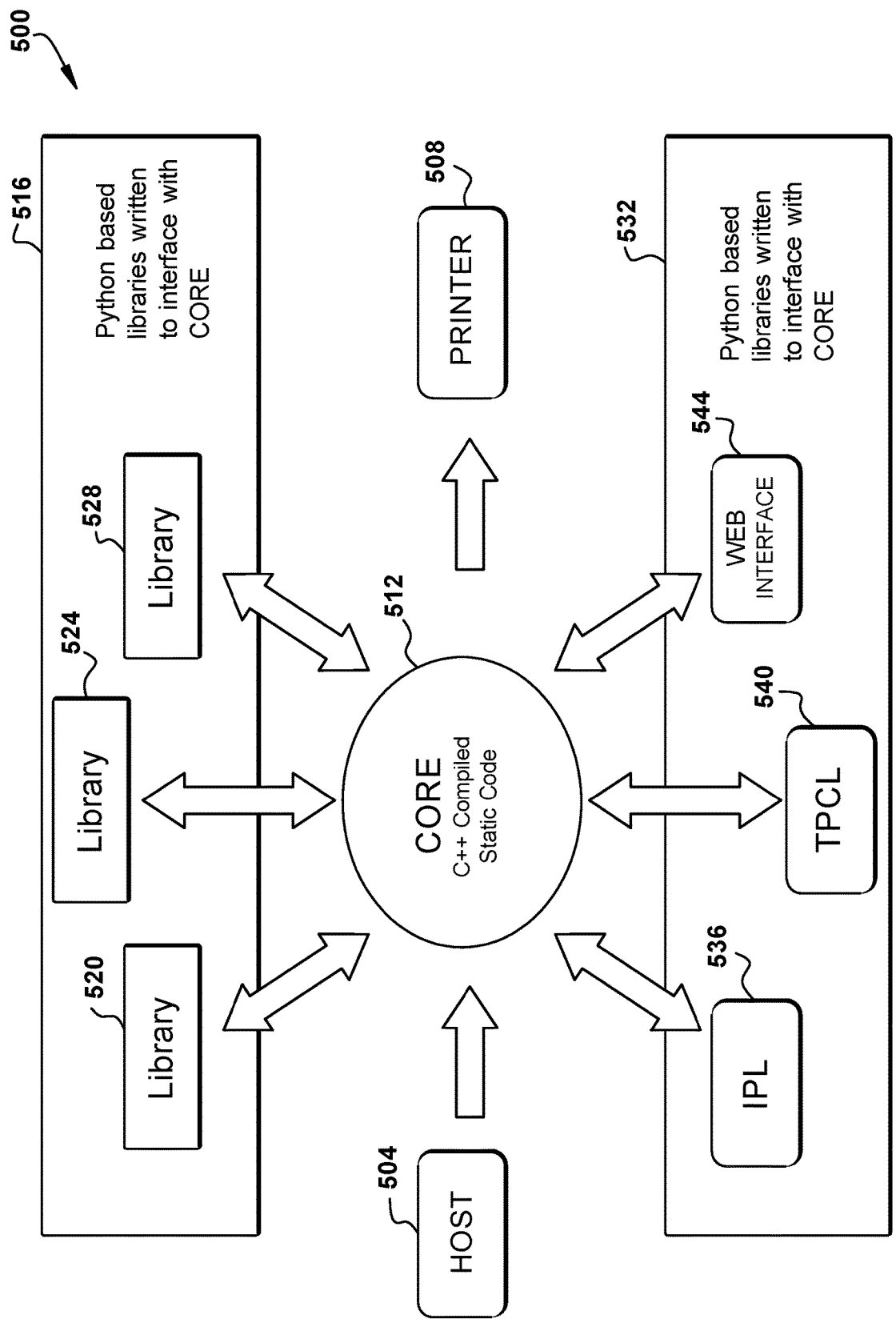
FIG. 5 is a block diagram of an example embodiment of a particular use case of a system for printer language emulation.
Figure 6:
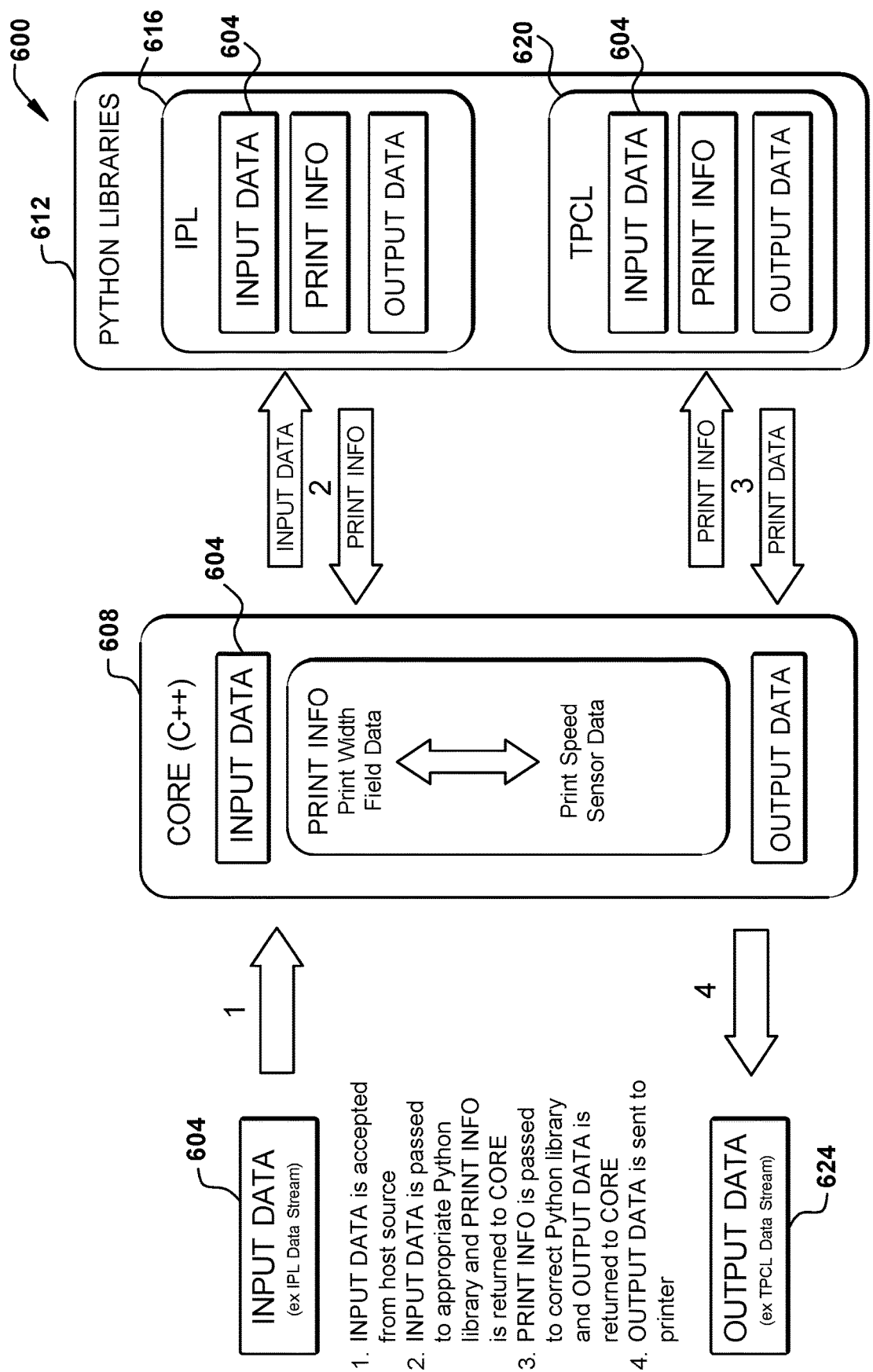
FIG. 6 is an additional block diagram in the use case of FIG. 5.

FIGS. 5 and 6 provide a block diagram 500 of an example embodiment of a particular use case of a system for printer language emulation. In FIG. 5, a job is communicated from host 504 to printer 508 via a microcomputer. The associated microcomputer includes a core component 512 compiled in any suitable language, such as static code compiled by C++. Core component 512 interfaces with library module 516, suitably comprise of one or more libraries, such as libraries 520, 524 and 528. Core component 512 also interfaces with an interface component 532, which, in the example, provides communication via languages such as IPL 5, Toshiba TEC's TCPL (TEC Printer Control Language) 540, as well as with other devices such as via web interface 544. Library module 516 and interface component 532 are suitably comprised of any suitable format, and are comprised of libraries in the PYTHON environment in the illustrated example.

FIG. 6 illustrates a block flow diagram 600 of the use case example embodiment of FIGS. 5 and 6. Input data 604 is suitably comprised of an IPL data stream that is accepted from a host source and relayed to core 608. Core 608 calls on PYTHON libraries 612 which include IPL library 616 and TCPL library 620. In this example, input data is in IPL format, and the libraries are used to generate output data 624 in TCPL format. Core 608 is further operable on additional information, such as with information received from a print speed sensor associated with a print device. Such speed information is suitably used in connection with print parameters such as print width and field data.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

The invention claimed is:

1. A system comprising:
a processor;
a memory storing one or more emulation libraries;
a data interface;
the processor configured to receive, into the memory from an associated print server via the data interface, an electronic document processing job formatted in job print language;
the processor further configured to determine whether the electronic document processing job is directed to an image rendering device compatible with the job print language; and
the processor further configured to send the electronic document processing job to the image rendering device when the electronic document processing job is directed to the image rendering device compatible with the job print language;
wherein, when the electronic document processing job is directed to the image rendering device incompatible with the job print language, the processor is further configured to
apply a first library corresponding to the job print language to the document processing job and receive print information responsive thereto, the print information comprising print width field data and print speed sensor data associated with the document processing job,
apply a second library corresponding to a language of the image rendering device to the print information and receive an emulated document processing job responsive thereto compatible with the image rendering device, and
send the emulated document processing job to the image rendering device.

2. The system of claim 1 wherein the emulated document processing job is comprised of Information Processing Language.

3. The system of claim 2 wherein the image rendering device is comprised of a label printer.

4. The system of claim 2 wherein the electronic document processing job is formatted on a PYTHON software platform.

5. The system of claim 2 wherein the processor, the memory and the data interface are comprised of a RASPBERRY PI computer.

6. The system of claim 1 wherein the processor is further configured to:
receive a second document processing job via the data interface from a point-of-sale device, a scanner or a scale;
apply a first library corresponding to a print language of the point-of-sale device, the scanner or the scale and receive second print information responsive thereto;
apply a second library corresponding to a language of a printing device to the second print information and receive a second emulated document processing job responsive thereto; and
send the second emulated document processing job to a printing device.

7. A method comprising:
a processor;
a memory storing one or more emulation libraries;
receiving, into a memory from an associated print server via a data interface, an electronic document processing job formatted in job print language;
determining whether the electronic document processing job is directed to a image rendering device compatible with the job print language;
sending the electronic document processing job to the image rendering device when the electronic document processing job is directed to the an image rendering device compatible with the job print language;
wherein, when the electronic document processing job is directed to the image rendering device incompatible with the job print language,
applying a first library corresponding to the job print language to the electronic document processing job and receiving print information responsive thereto, the print information comprising print width field data and print speed sensor data associated with the document processing job,
applying a second library corresponding to a language of the incompatible image rendering device to the print information and receiving an emulated document processing job responsive thereto, and
sending the emulated document processing job to the printing device compatible with the emulated document processing job.

8. The method of claim 7 wherein the emulated document processing job is comprised of Information Processing Language.

9. The method of claim 8 wherein the image rendering device is comprised of a label printer.

10. The method of claim 8 wherein the electronic document processing job is formatted on a PYTHON software platform.

11. The method of claim 8 wherein the processor, the memory and the data interface are comprised of a RASPBERRY PI computer.

12. The method of claim 7 further comprising:
receiving a second document processing job via the data interface from a point-of-sale device, a scanner or a scale;
applying a first library compatible with the point-of-sale device, the scanner or the scale to the second emulated document processing job and receiving print information responsive thereto;
applying a second library compatible with an image rendering device to the print information and receiving a second emulated document processing job responsive thereto; and
sending the second emulated document processing job to the image rendering device.

13. A system comprising:
a document processing server configured to receive a print job directed to a specified printer from an associated networked digital device via a network interface;
the document processing server further configured to selectively apply a first library associated with the print job to generate print information, the print information comprising print width field data and print speed sensor data;

the document processing server further configured to selectively apply a second library associated with the specified printer to the print information to form an emulated print job; and the document processing server further configured to send the print job or the emulated print job to the specified printer via the network interface.

14. The system of claim 13 wherein the property of the specified printer is associated with its manufacturer.

15. The system of claim 13 wherein the property of the specified printer is associated its printer type.

16. The system of claim 15 wherein the printer type is comprised of one of a multifunction peripheral and a label printer.

17. The system of claim 15 wherein the emulation library translates the print job to Information Processing Language.

* * * * *